US012572255B2

(12) United States Patent
Xu

(10) Patent No.: US 12,572,255 B2
(45) Date of Patent: Mar. 10, 2026

(54) NOTIFICATION MESSAGE DISPLAY METHOD AND APPARATUS, DEVICE, READABLE STORAGE MEDIUM, AND CHIP

(71) Applicant: VIVO MOBILE COMMUNICATION CO., LTD., Dongguan (CN)

(72) Inventor: Chao Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 162 days.

(21) Appl. No.: 18/378,137

(22) Filed: Oct. 9, 2023

(65) Prior Publication Data

US 2024/0045566 A1    Feb. 8, 2024

Related U.S. Application Data

(63) Continuation of application No. PCT/CN2022/085873, filed on Apr. 8, 2022.

(30) Foreign Application Priority Data

Apr. 9, 2021    (CN) .......................... 202110382850.2

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *H04L 51/224* (2022.05); *H04M 1/72436* (2021.01)

(58) Field of Classification Search
CPC . H04L 51/224; G06F 3/04817; G06F 3/0482; G06F 3/0488; H04M 1/72436; H04M 1/72469
See application file for complete search history.

(56) References Cited

U.S. PATENT DOCUMENTS 5,835,084 A       11/1998  Bailey et al.
11,144,172 B2 *   10/2021  Qian ................... G06F 3/04817
                           (Continued)

FOREIGN PATENT DOCUMENTS

CN       103927081 A       7/2014
CN       106302107 A       1/2017
                           (Continued)

OTHER PUBLICATIONS

International Search Report issued in corresponding International Application No. PCT/CN2022/085873, mailed Jun. 22, 2022, 6 pages.

(Continued)

*Primary Examiner* — Nicholas Ulrich
(74) *Attorney, Agent, or Firm* — IPX PLLC

(57)                ABSTRACT

This application discloses a notification message display method, an electronic device, and a non-transitory computer-readable storage medium. The method includes: receiving a first input performed on an application program icon, and displaying, in response to the first input, a message preview window corresponding to the application program icon. The message preview window includes a target content in at least one notification message received by the application program to which the application program icon belongs.

12 Claims, 6 Drawing Sheets

(51) Int. Cl.
    *H04L 51/224*      (2022.01)
    *H04M 1/72436*    (2021.01)

(56) References Cited

U.S. PATENT DOCUMENTS

| | | | |
|---|---|---|---|
| 2005/0120306 A1* | 6/2005 | Klassen | G06F 3/0488 |
| | | | 715/765 |
| 2015/0350414 A1* | 12/2015 | Park | G06F 3/04817 |
| | | | 455/566 |
| 2020/0344196 A1* | 10/2020 | Lee | H04M 1/724 |

FOREIGN PATENT DOCUMENTS

| | | | |
|---|---|---|---|
| CN | 106933682 A | | 7/2017 |
| CN | 107181858 A | | 9/2017 |
| CN | 110750188 A | | 2/2020 |
| CN | 111796730 A | * | 10/2020 |
| CN | 111885258 A | | 11/2020 |
| CN | 111984162 A | | 11/2020 |
| CN | 112099685 A | | 12/2020 |
| CN | 112286412 A | | 1/2021 |
| CN | 112286416 A | | 1/2021 |
| CN | 113114845 A | | 7/2021 |
| WO | 2016023341 A1 | | 2/2016 |

OTHER PUBLICATIONS

First Office Action issued in related Chinese Application No. 202110382850.2, mailed Dec. 24, 2021, 7 pages.

* cited by examiner

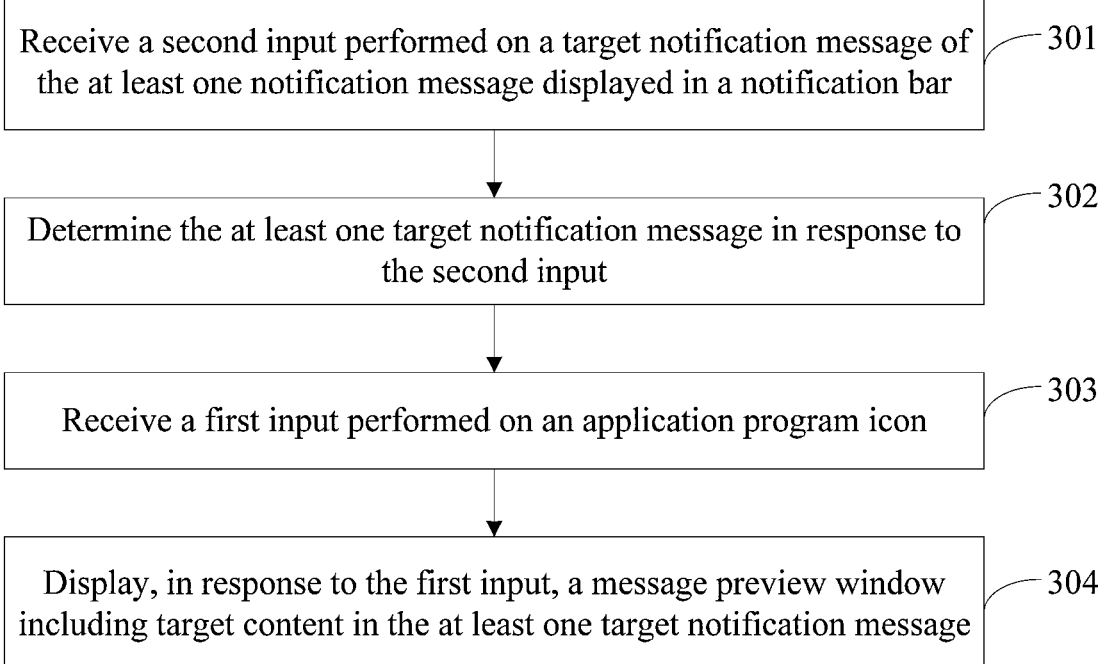

Receive a second input performed on a target notification message of the at least one notification message displayed in a notification bar ⌐ 301

Determine the at least one target notification message in response to the second input ⌐ 302

Receive a first input performed on an application program icon ⌐ 303

Display, in response to the first input, a message preview window including target content in the at least one target notification message ⌐ 304

FIG. 3

NOTIFICATION MESSAGE DISPLAY METHOD AND APPARATUS, DEVICE, READABLE STORAGE MEDIUM, AND CHIP

CROSS-REFERENCE TO RELATED APPLICATIONS

This application is a continuation of International Application No. PCT/CN2022/085873, filed Apr. 8, 2022, which claims priority to Chinese Patent Application No. 202110382850.2, filed Apr. 9, 2021. The entire contents of each of the above-referenced applications are expressly incorporated herein by reference.

TECHNICAL FIELD

The present application relates to the communication field, and in particular relates to a notification message display method and apparatus, a device, a readable storage medium, and a chip.

BACKGROUND

With the development of Internet technologies, there are more and more application scenarios of electronic devices in work and life. Different types of application programs are installed in electronic devices to meet different needs of users. Application programs usually receive various notification messages pushed by servers, so as to facilitate users to obtain relevant information in a timely manner. As the number of application programs increases, more and more notification messages are displayed in a notification bar.

In the prior art, an electronic device usually displays a received notification message in a notification bar, which is convenient for a user to preview the notification message. When there are many notification messages displayed in the notification bar, it takes a long time for the user to find the desired notification message from the notification bar.

SUMMARY

The purpose of the embodiments of the present application is to provide a notification message display method and apparatus, a device, a readable storage medium, and a chip.

According to a first aspect, an embodiment of the present application provides a notification message display method, the method including:

receiving a first input performed on an application program icon; and displaying a message preview window in response to the first input; where the message preview window includes target content in at least one notification message, and the notification message is a notification message received by an application program to which the application program icon belongs.

According to a second aspect, an embodiment of the present application provides a notification message management apparatus, the apparatus including:

a receiving module, configured to receive a first input performed on an application program icon; and a display module, configured to display a message preview window in response to the first input; where the message preview window includes target content in at least one notification message, and the notification message is a notification message received by an application program to which the application program icon belongs.

According to a third aspect, an embodiment of this application provides an electronic device. The electronic device includes a processor, a memory, and a program or an instruction stored in the memory and capable of running on the processor. When the program or the instruction is executed by the processor, the steps of the method according to the first aspect are implemented.

According to a fourth aspect, an embodiment of this application provides a readable storage medium. The readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction, to implement the method according to the first aspect.

In this embodiment of the present application, the electronic device receives the first input performed on the application program icon, and displays, in response to the first input, the message preview window corresponding to the application program icon. The message preview window includes target content in at least one notification message received by the application program to which the application program icon belongs.

BRIEF DESCRIPTION OF DRAWINGS

To describe the technical solutions in embodiments of this application or the related technology more clearly, the following briefly describes the accompanying drawings required for describing the embodiments or the related technology. Apparently, the accompanying drawings in the following descriptions show some embodiments of this application, and a person of ordinary skill in the art may still derive other drawings from these accompanying drawings without creative efforts.

FIG. 3 is a flowchart of steps of another notification message display method according to an exemplary embodiment;

DETAILED DESCRIPTION

The following clearly describes technical solutions in embodiments of this application in conjunction with the accompanying drawings in the embodiments of this application. Clearly, the described embodiments are some but not all of the embodiments of this application. All other embodiments obtained by persons of ordinary skill in the art based on the embodiments of the disclosure shall fall within the scope of protection of the disclosure.

The terms "first", "second", and the like in the description and the claims of this application are used to distinguish between similar objects, and do not need to be used to describe a specific order or sequence. It should be understood that, data used in such a way is interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specification and the claims, "and/or" represents at least one of connected objects, and a character "/" generally represents an "or" relationship between associated objects.

With reference to the accompanying drawings, the following describes in detail the notification message display method in the embodiments of this application based on specific embodiments and application scenarios.

Figure 1:
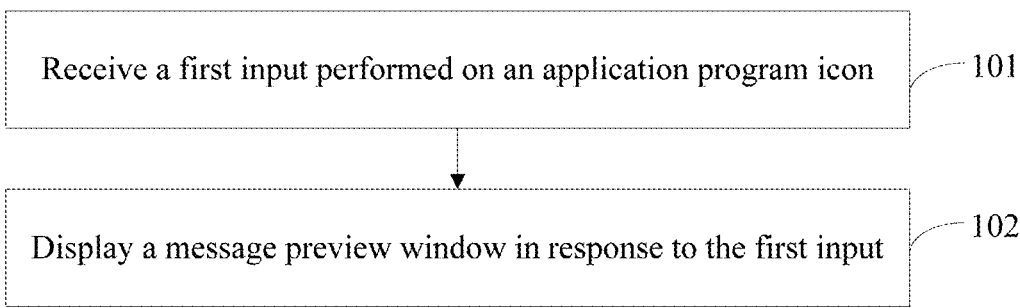
FIG. 1 is a flowchart of steps of a notification message display method according to an exemplary embodiment.

Referring to FIG. 1, FIG. 1 is a flowchart of steps of a notification message display method according to an exemplary embodiment. The method may include:

Step 101: Receive a first input performed on an application program icon.

Step 102: Display a message preview window in response to the first input.

The message preview window includes target content in at least one notification message, and the notification message is a notification message received by an application program to which the application program icon belongs. The message preview window is used to preview the notification messages received by the application to which the application program icon belongs. The target content is part or all of the content in the notification message. If the notification message contains many content, the target content may be part of the content in the notification message, such as keywords, titles, or content summaries in the notification message. On the contrary, if the notification message contains less content, the target content may be all the content in the notification message. The target content can be set according to requirements, which is not limited in this embodiment.

Figure 2:
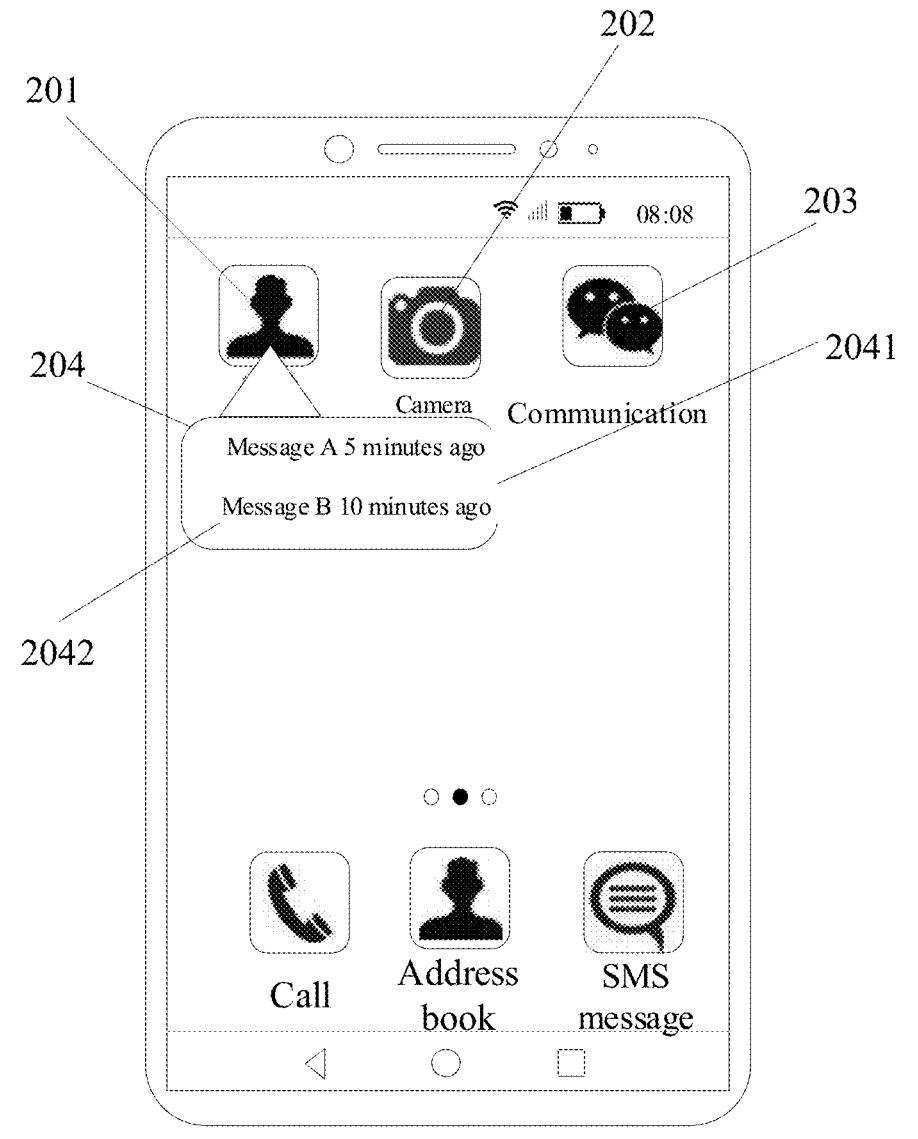
FIG. 2 is a schematic diagram of a desktop of an electronic device according to an exemplary embodiment.

In this embodiment, the notification message display method may be executed by an electronic device with a display screen, such as a mobile phone, a tablet computer, and a notebook computer. The first input is used to select the application program icon displayed in the display screen. As shown in FIG. 2, FIG. 2 is a schematic diagram of the desktop of an electronic device according to an exemplary embodiment. The display screen includes a first application program icon 201 of application A, a second icon 202 of application B, and a third application program icon 203 of application program C. The first input is, for example, a press operation of long pressing the first application program icon 201. After the electronic device receives the user's press operation on the first application program icon 201, if the pressing time exceeds a preset duration, such as 2 seconds, the electronic device may display a message preview window 204 in response to the user's pressing operation, where the message preview window 204 displays target content of at least one notification message received by the application program A. A specific form of the first input may be set according to requirements, which is not limited in this embodiment.

In an embodiment, the electronic device may sequentially display target content in multiple notification messages in the message preview window according to receiving times of the notification messages. As shown in FIG. 2, application A receives a first notification message and a second notification message at different time points respectively, the interval between the first notification message and the current time is 5 minutes, and the interval between the second notification message and the current time is 10 minutes. The electronic device sequentially displays the target content 2041 in the first notification message and the target content 2042 in the second notification message in the message preview window 204 in ascending order of intervals of receiving times. In practical application, the electronic device displays the target content in the notification message according to the receiving time of the notification message, which can facilitate the user to sequentially preview the notification messages according to the receiving times of the notification messages.

In an embodiment, when the application program receives few notification messages, the message preview window can display the target content in all the notification messages received by the application program, and when the application program receives many notification messages, only display target content in some notification messages. When only target content in some notification messages is displayed in the message preview window, the user can operate the message preview window and slide the target content in the message preview window to view the target content in all notification messages.

In another embodiment, when the number of notification messages received by the application program is large, the electronic device may alternately display the target content in all the notification messages in the message preview window at a preset frequency. For example, if the application program receives 10 notification messages, the electronic device can display the target content in two of the notification messages at a time, and replace the target content in the message preview window every 2 seconds, to display the target content in the 10 notification messages in sequence. The target content may also include the receiving time of the notification message. As shown in FIG. 2, the target content of the first notification message includes the receiving time of the first notification message. When the target content includes the receiving time of the message, it may be convenient for the user to choose to view the notification message according to the receiving time.

In practical applications, when the number of notification messages received by the application is large, the target content in the notification message is alternately displayed in the message preview window, and a small area of the message preview window can be set to avoid a large message preview window that affects the display of other content on the screen.

To sum up, in this embodiment, the electronic device receives the first input performed on the application program icon, and displays, in response to the first input, the message preview window corresponding to the application program icon. The message preview window includes target content in at least one notification message received by the application program to which the application program icon belongs. When there are many notification messages displayed in the notification bar, the user can operate the application program icon to display the message preview window corresponding to the application program, and preview, through the message preview window, the notification messages received by the application program, which can avoid searching for notification messages in the notification bar, save a search time, and improve search efficiency.

Referring to FIG. 3, FIG. 3 is a flowchart of steps of another notification message display method according to an exemplary embodiment. The method may include:

Step 301: Receive a second input performed on a target notification message of the at least one notification message displayed in a notification bar.

Step 302: Determine at least one target notification message in response to the second input.

The second input is used to determine the target notification message from all the notification messages received by the application program, so that the electronic device displays the target content in the target notification message in the message preview window. In some cases, the application program may receive many notification messages, some of which may be worthless notification messages, and some of which are valuable notification messages, and valuable notification messages are target notification messages. When the application program receives the notification message, the user may not have time to read the notification message immediately in detail, and the user may forget the notification message at a later time. In this case, the user can select to determine the target notification message in the notification bar, and preview the target notification message through the message preview window in an idle time.

Figure 4:
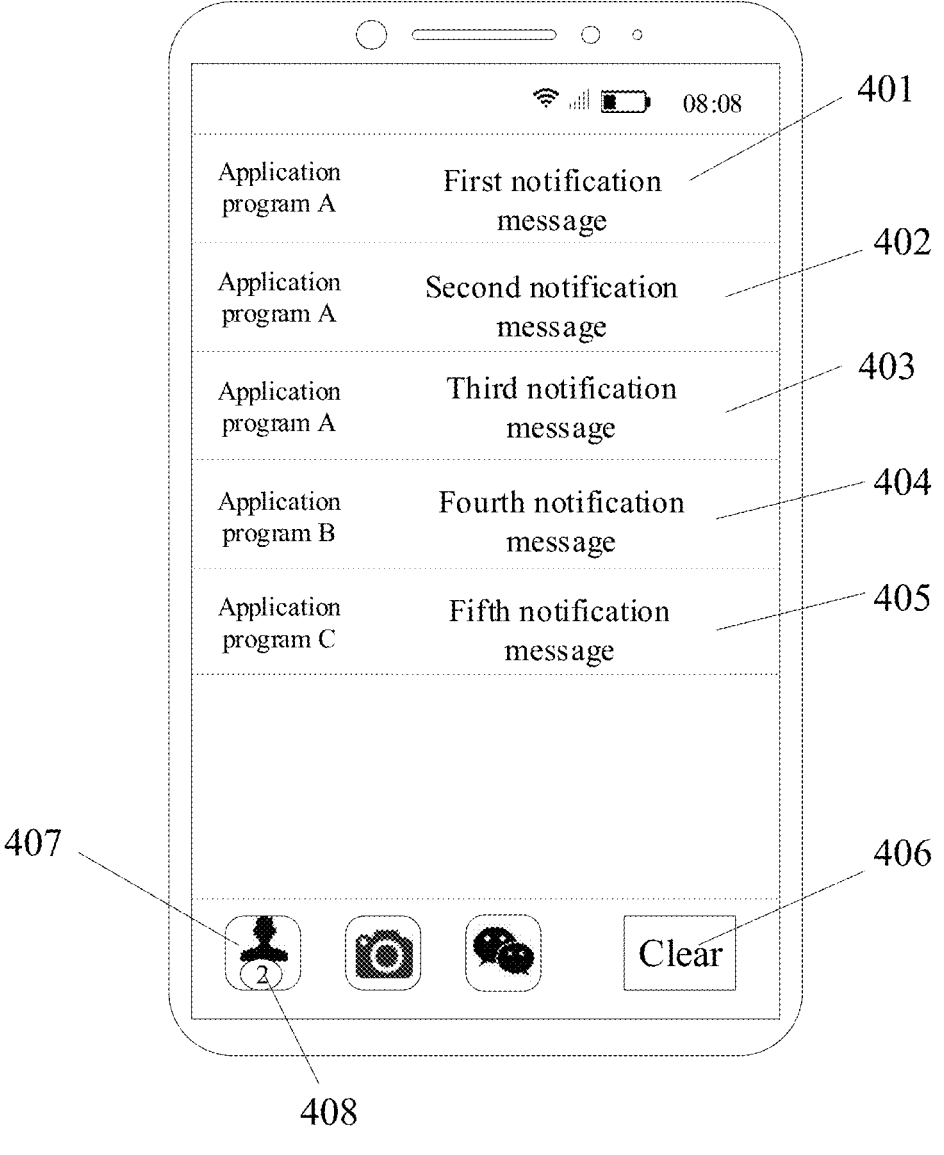
FIG. 4 is a schematic interface diagram of a notification bar according to an exemplary embodiment.

Exemplarily, FIG. 4 is a schematic interface diagram of a notification bar according to an exemplary embodiment, and the notification bar includes notification messages received by application A, application B, and application C. The second input is, for example, a pressing operation of long pressing a notification message. When the user long presses the first notification message 401 received by the application program A displayed in the notification bar, the electronic device may respond to the user's pressing operation and determine the first notification message 401 as the target notification message. Similarly, it may be determined that the second notification message 402 received by the application program A is the target notification message. A specific form of the second input may be set according to requirements, which is not limited in this embodiment.

In some embodiments, the method may also include:

canceling displaying notification messages other than the target notification message in the notification bar, or clearing all notification messages displayed in the notification bar.

In an embodiment, after the user determines the target notification message, notification messages other than the target notification message in the notification bar may be manually deleted, or the notification bar may be cleared. As shown in FIG. 4, the notification bar includes a clear button 406. After the user determines that the first notification message 401 and the second notification message 402 are target notification messages, the user can click the clear button 406, and the electronic device can respond to the user's click operation, delete the third notification message 403, the fourth notification message 404, and the fifth notification message 405 other than the first notification message 401 and the second notification message 402 in the notification bar, or delete all notification messages in the notification bar.

In another embodiment, after the electronic device determines the target notification message, it may automatically delete notification messages in the notification bar other than the target notification message, or clear the notification bar. For example, after the electronic device determines that the first notification message 401 and the second notification message 402 are target notification messages in response to the user's click operation on the first notification message 401 and the second notification message 402, if it receives no other operation of the user after waiting for a preset period of timed, it may be considered by default that the user selects no other notification message, and the third notification message 403, the fourth notification message 404, and the fifth notification message 405 in the notification bar may be automatically deleted, or all notification messages in the notification bar may be deleted.

In practical applications, after the target notification message is determined, other notification messages other than the target notification message are deleted or the notification bar is cleared, which can avoid displaying many notification messages in the notification bar, so that when the user receives a new notification message, the new notification message is processed.

In an embodiment, the notification bar may also include an application program icon. After determining the target notification message and canceling the display of the target notification message in the notification bar, the electronic device may display identification information at a preset location of the application program icon displayed in the notification bar, to remind the user that the target notification message in the application program to which the application program icon belongs is included by the user. As shown in FIG. 2 and FIG. 4, when the user determines that the first notification message and the second notification message are target notification messages of application program A, and deletes the first notification message and the second notification message in the notification bar, the electronic device can display identification information 408 on a first application program icon 407 in the notification bar, so that the user can determine through the identification information 408 that the target notification message in the application program A is included by the user.

In another embodiment, after receiving a sixth input from the user on the first application program icon 407 and/or identification information 408 displayed in the notification bar, the electronic device may respond to the sixth input and resume display of the target notification message in the notification bar. With reference to the above example, after the user clicks on the identification information 408, the electronic device may resume display of the first notification message and the second notification message in the notification bar in response to the user's click operation. The identification information may identify a number of target notification messages. As shown in FIG. 4, the identification information 408 includes a number "2", which corresponds to a number of target notification messages in application program A.

Step 303: Receive a first input performed on an application program icon.

In some embodiments, the method may also include:

displaying, at a first preset location on the application program icon, identification information corresponding to the target notification message.

Figure 5:
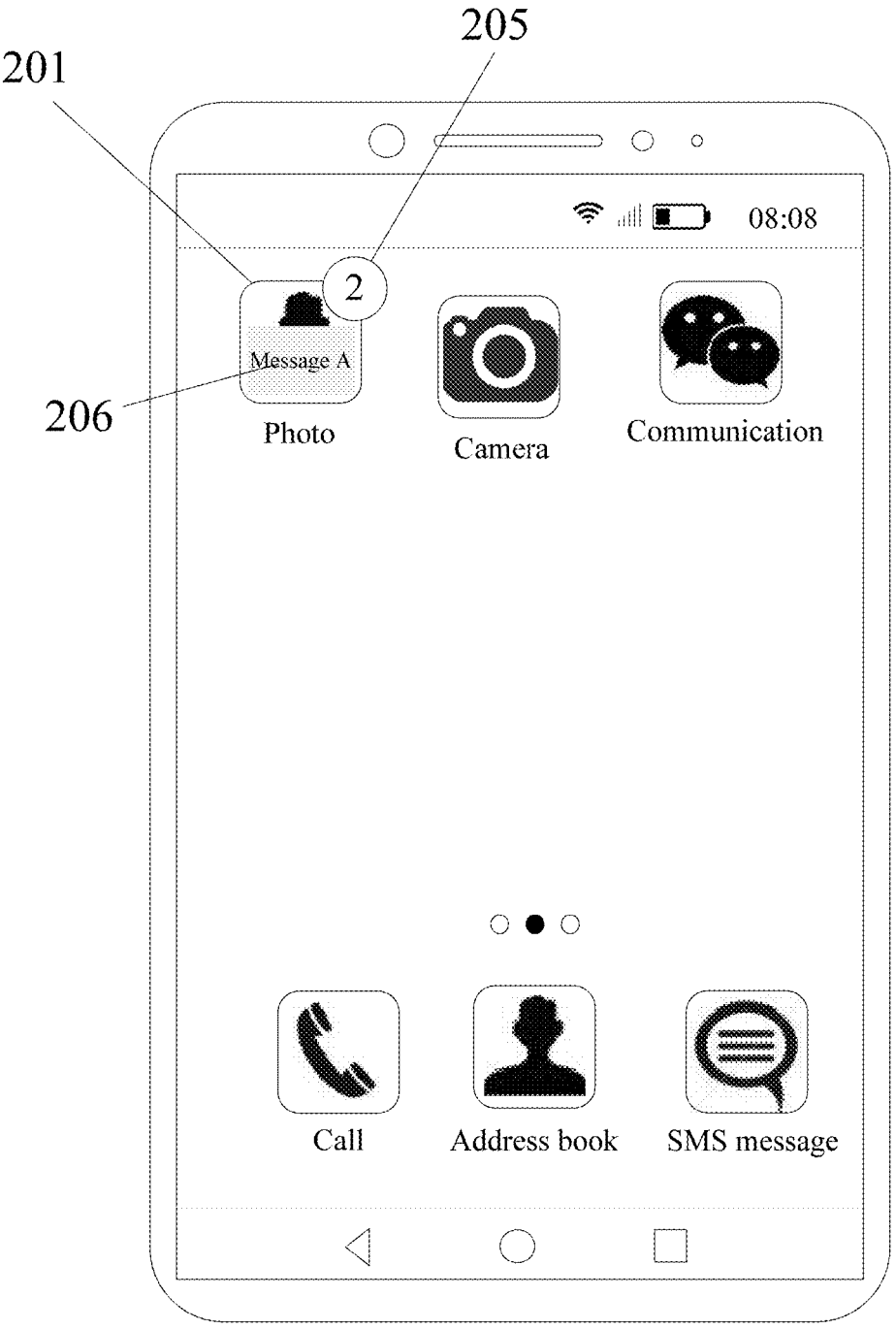
FIG. 5 is a schematic diagram of another desktop of an electronic device according to an exemplary embodiment.

In an embodiment, after determining the target notification message, the electronic device may display corresponding identification information at a first preset location on the application program icon displayed on the display screen, so as to remind the user that the application program to which the application program icon belongs has the target notification message included by the user. As shown in FIG. 5, FIG. 5 is a schematic diagram of the desktop of another electronic device according to an exemplary embodiment. In combination with the above example, if the user selects the first notification message and the second notification message of application program A as target notification messages in the notification bar, after the notification bar is closed, the electronic device can display identification information 205 in the upper right corner of the first application program icon 201, where the upper right corner is the first preset location, to identify that the application program A includes the target notification message selected and determined by the user. The identification information may display a number of target notification messages. As shown in FIG. 5, the identification information 205 includes a number "2", and the number "2" indicates a number of target notification messages in application program A. A specific form of the identification information can be set according to requirements, which is not limited in this embodiment.

In practical applications, when the user selects the target notification message in the notification bar, the electronic device displays corresponding identification information on the application program icon displayed on the display screen, which can remind the user that the application program includes the notification message that has been included, and avoid that the user forgets the target notification message.

In some embodiments, the method may also include:
dynamically displaying the target content in the at least one notification message at a second preset location of the application program icon.

The second preset location may be on the application program icon, or may be a location such as the left side or the right side of the application program icon.

In this embodiment, the electronic device may dynamically display, at the second preset location of the application program icon, the target content in the notification message included in the application program. As shown in FIG. 5, the electronic device may alternately display target content 206 in the first notification message and the second notification message immediately above the first application program icon 201 at a preset frequency. In some embodiments, the electronic device may display the target content 206 in the first notification message and the second notification message at the second preset location in a scroll manner. A specific location of the second preset location and the specific manner of dynamic display can be set according to requirements, which are not limited in this embodiment.

What is displayed at the second preset location may be the target content in the pre-determined target notification message. When the target content in the target notification message is displayed at the second preset location, a number of messages corresponding to the second preset location may be reduced.

In practical applications, the target content in the at least one notification message is dynamically displayed at the second preset location of the application program icon, which can remind the user that the application program to which the application program icon belongs has received the notification message, and can facilitate the user to directly preview the content in the notification message.

Step 304: Display, in response to the first input, a message preview window including target content in the at least one target notification message.

In this embodiment, when the user selects and determines a target notification message of an application program from the notification bar, the electronic device may only display the target content in the target notification message when displaying a message preview window corresponding to the application program. With reference to the above example, when the user selects and determines the first notification message and the second notification message in application program A as target notification messages in the notification bar, when the electronic device displays the message preview window 204, only target content in the first notification message and the second notification message may be displayed, and target content in the third notification message is not displayed in the message preview window.

In practical application, after the application program receives the notification message, the user may first select and determine the more important target notification message in the notification bar to include the target notification message. At a later time, if the user needs to view the target notification message, the user can display the message preview window by operating the application program icon, and preview the determined target notification message through the message preview window. Displaying the target content in the target notification message in the message preview window can reduce the number of messages corresponding to the message preview window, thereby reducing the content in the message preview window.

In some embodiments, the method may also include:
receiving a third input; and
displaying a message reading interface in response to the third input.

Figure 6:
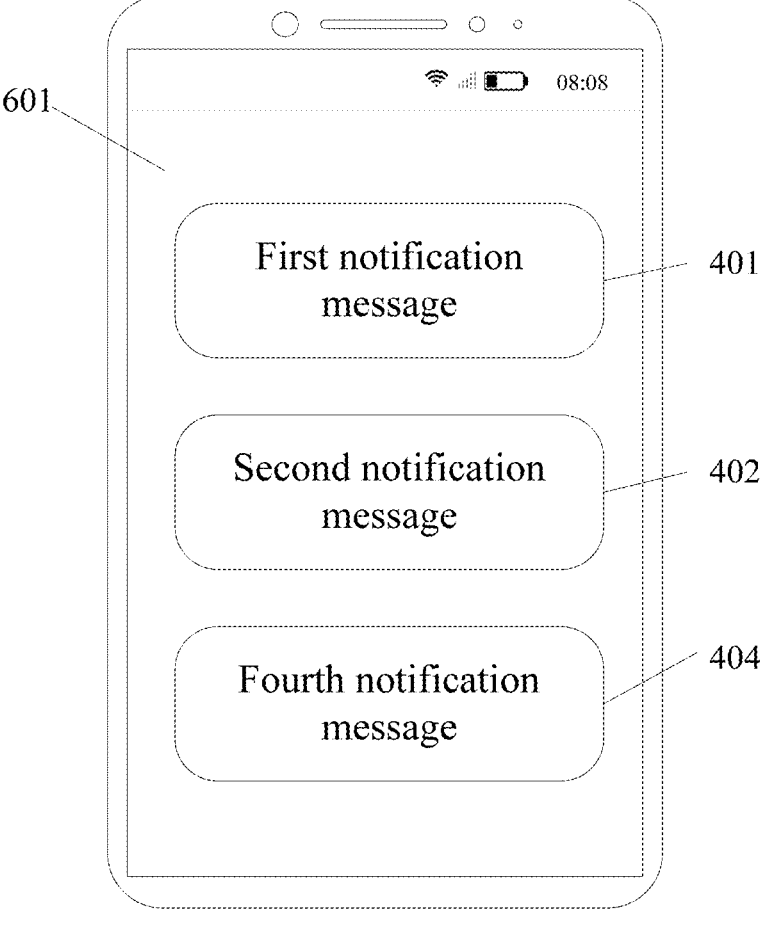
FIG. 6 is a schematic diagram of a message reading interface according to an exemplary embodiment.

In this embodiment, after the target notification message is determined, the electronic device may display a message reading interface to facilitate the user to read the target notification message. As shown in FIG. 6, FIG. 6 is a schematic diagram of a message reading interface according to an exemplary embodiment. The third input may be a click operation of clicking the message preview window, or a click operation of clicking the target content in the message preview window, and the electronic device may display a message reading interface 601 in response to the user's click operation. The message reading interface includes the target notification message. With reference to the above example, the message reading interface 601 includes the target notification message in the application program A, that is, the first notification message 401 and the second notification message 402. The specific form of the third input may be set according to requirements. For example, the third input may also be a click operation of clicking a physical button or a virtual button included in the electronic device, which is not limited in this embodiment.

In practical applications, after the user determines the target notification message, the electronic device can include the target notification message in the message reading interface, and the user can operate the electronic device to display the message reading interface, and can read the target notification message through the message reading interface, which is convenient for the user to read the target notification message.

In an embodiment, the message reading interface may include target notification messages in all application programs. As shown in FIG. 4 and FIG. 6, if the user also selects and determines a fourth notification message 404 in the application program B as the target notification message, the message reading interface may include the first notification message 401 and the second notification message 402 in the application program A and the fourth notification message 404 in application program B. The message reading interface includes target notification messages in all application programs, which can facilitate the user to read and manage all target notification messages.

In some embodiments, the method may also include:

receiving a fourth input performed on the target notification message included in the message reading interface; and in response to the fourth input, displaying a message management interface in the application program, where the message management interface is used to manage notification messages received by the application program; and/or receiving a fifth input in the message preview window; and in response to the fifth input, displaying a message management interface.

In this embodiment, the electronic device may receive the user's fourth input through the message reading interface, and open the message management interface in the application program in response to the fourth input. As shown in FIG. 6, the fourth input may be a click operation of clicking the first notification message 401 in the message reading interface 601, and the electronic device may respond to the user's click operation on the first notification message 401, start the application program A, and display the message management interface in application program A. In this case, the user can carefully read, through the message management interface, the notification messages received by the application program A, and manage all the notification messages received by the application program A. The specific form of the fourth input can be set according to requirements, which is not limited in this embodiment.

In another embodiment, the user can also open the message management interface through the message preview window. As shown in FIG. 2, the fifth input may be a click operation of clicking target content 2041 in the message preview window 204, or a click operation of clicking the message preview window 204, and the electronic device may start the application program A in response to the user's click operation, and display the message management interface in application program A. The specific form of the fifth input can be set according to requirements, which is not limited in this embodiment.

In practical applications, the user can quickly enter the message management interface of the application program through the message preview window and the message reading interface, read the notification messages received by the application program, or manage all notification messages received by the application program, which is convenient for users to manage notifications information.

In this embodiment of the present application, the electronic device receives the first input performed on the application program icon, and displays, in response to the first input, the message preview window corresponding to the application program icon. The message preview window includes target content in at least one notification message received by the application program to which the application program icon belongs. When there are many notification messages displayed in the notification bar, the user can operate the application program icon to display the message preview window corresponding to the application program, and preview, through the message preview window, the notification messages received by the application program, which can avoid searching for notification messages in the notification bar, save a search time, and improve search efficiency.

It should be noted that, the notification message display method provided in the embodiment of the present application may be executed by a notification message display apparatus, or a control module in the notification message display apparatus for executing the notification message display method. In the embodiment of the present application, the notification message display method being performed by the notification message display apparatus is taken as an example to illustrate the notification message display apparatus provided in the embodiment of the present application.

Figure 7:
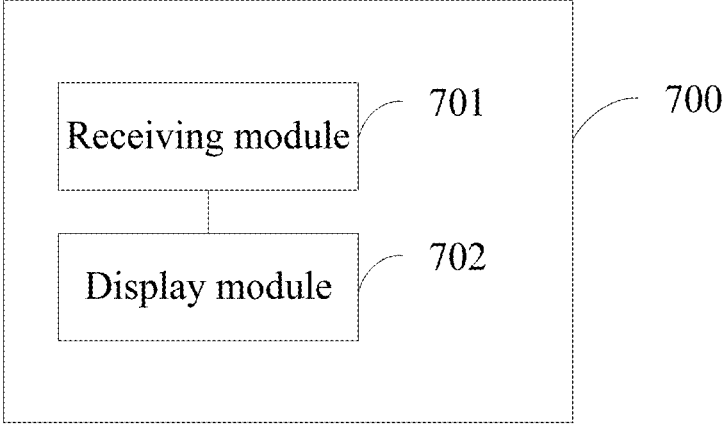
FIG. 7 is a schematic structural diagram of a notification message display apparatus according to an exemplary embodiment.

Referring to FIG. 7, FIG. 7 is a schematic structural diagram of a notification message display apparatus according to an exemplary embodiment. The apparatus 700 may include:

a receiving module 701, configured to receive a first input performed on an application program icon; and a display module 702, configured to display a message preview window in response to the first input; where the message preview window includes target content in at least one notification message, and the notification message is a notification message received by an application program to which the application program icon belongs.

In some embodiments, the receiving module 701 is further configured to receive a second input performed on a target notification message of the at least one notification message displayed in a notification bar; and determine the at least one target notification message in response to the second input.

The display module 702 is configured to display, in response to the first input, a message preview window including the target content in the at least one target notification message.

In some embodiments, the apparatus 700 may also include:

a clearing module, configured to cancel displaying notification messages other than the target notification message in the notification bar or clear all notification messages displayed in the notification bar.

In some embodiments, the receiving module 701 is also configured to receive a third input.

The display module 702 is also configured to display a message reading interface in response to the third input.

In some embodiments, the display module 702 is further configured to display, at a first preset location on the application program icon, identification information corresponding to the target notification message.

To sum up, in this embodiment, the electronic device receives the first input performed on the application program icon, and displays, in response to the first input, the message preview window corresponding to the application program icon. The message preview window includes target content in at least one notification message received by the application program to which the application program icon belongs. When there are many notification messages displayed in the notification bar, the user can operate the application program icon to display the message preview window corresponding to the application program, and preview, through the message preview window, the notification messages received by the application program, which can avoid searching for notification messages in the notification bar, save a search time, and improve search efficiency.

The notification message display apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of the present application.

The notification message display apparatus in the embodiment of the present application may be an apparatus with an operating system. The operating system may be an Android operating system, an iOS operating system, or another possible operating system, which is not specifically limited in this embodiment of this application.

The notification message display apparatus provided in this embodiment of the present application can implement processes implemented by the payment interface display apparatus in the method embodiments of FIG. 1 to FIG. 3. To avoid repetition, details are not described herein again.

Figure 8:
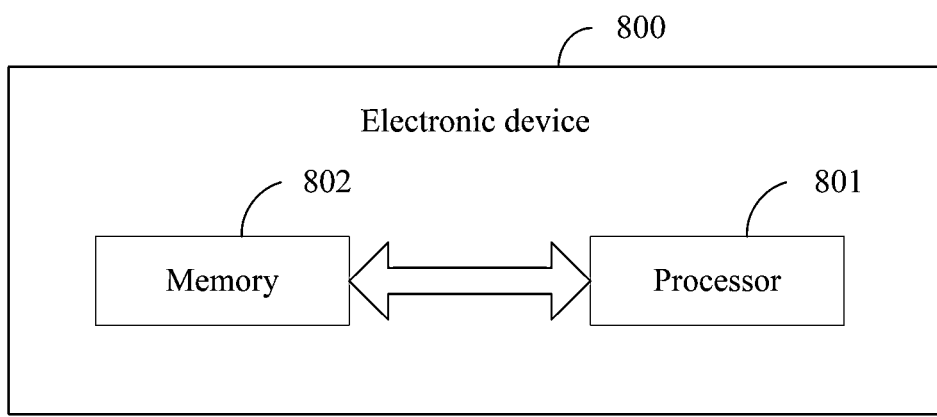
FIG. 8 is a schematic structural diagram of an electronic device according to an exemplary embodiment.

As shown in FIG. 8, FIG. 8 is a schematic structural diagram of an electronic device according to an exemplary embodiment. The electronic device 800 includes a processor 801, a memory 802, and a program or an instruction stored in the memory 802 and executable on the processor 801. When the program or instruction is executed by the processor 801, each process of the notification message display method embodiment described above can be realized, and the same technical effect can be achieved. To avoid repetition, details are not repeated herein.

It should be noted that the electronic device in the embodiments of this application includes the foregoing mobile electronic device and the foregoing non-mobile electronic device.

Figure 9:
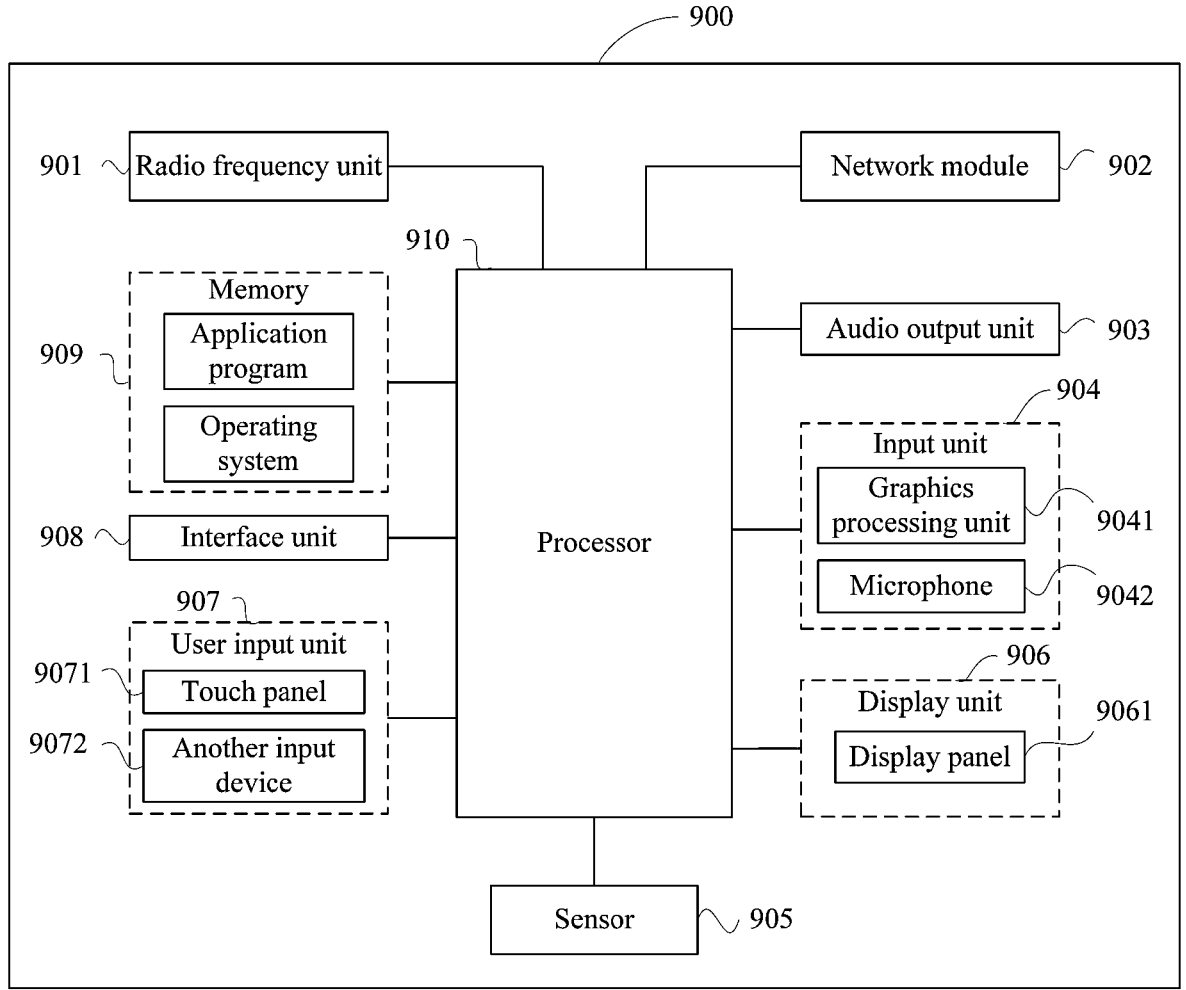
FIG. 9 is a schematic diagram of a hardware structure of an electronic device according to an exemplary embodiment.

FIG. 9 is a schematic diagram of a hardware structure of an electronic device according to an exemplary embodiment.

An electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

It may be understood by a person skilled in the art that the electronic device 900 may further include a power supply (such as a battery) that supplies power to each component. The power supply may be logically connected to the processor 910 by using a power management system, to implement functions such as charging, discharging, and power consumption management by using the power management system. A structure of the electronic device shown in FIG. 9 does not constitute a limitation on the electronic device, and may include more or fewer components than those shown in the figure, or combine some components, or have different part arrangements. Details are not described herein again.

The display unit 906 is configured to receive a first input performed on an application program icon; and display a message preview window in response to the first input; where the message preview window includes target content in at least one notification message, and the notification message is a notification message received by an application program to which the application program icon belongs.

In this embodiment of the present application, the electronic device receives the first input performed on the application program icon, and displays, in response to the first input, the message preview window corresponding to the application program icon. The message preview window includes target content in at least one notification message received by the application program to which the application program icon belongs. When there are many notification messages displayed in the notification bar, the user can operate the application program icon to display the message preview window corresponding to the application program, and preview, through the message preview window, the notification messages received by the application program, which can avoid searching for notification messages in the notification bar, save a search time, and improve search efficiency.

In some embodiments, the display unit 906 is configured to receive a second input performed on a target notification message of the at least one notification message displayed in a notification bar; and determine the at least one target notification message in response to the second input.

The step of displaying a message preview window in response to the first input includes: displaying, in response to the first input, a message preview window including target content in the at least one target notification message.

In practical application, after the application program receives the notification message, the user may first select and determine the more important target notification message in the notification bar to include the target notification message. At a later time, if the user needs to view the notification message, the user can display the message preview window by operating the application program icon, and preview the target notification message through the message preview window.

In some embodiments, the display unit 906 is further configured to cancel displaying notification messages other than the target notification message in the notification bar or clear all notification messages displayed in the notification bar.

In practical applications, after the target notification message is determined, other notification messages other than the target notification message are deleted or the notification bar is cleared, which can avoid displaying many notification messages in the notification bar, so that when the user receives a new notification message, the new notification message is processed.

In some embodiments, the display unit 906 is further configured to receive a third input; and display a message reading interface in response to the third input; where the message reading interface includes the target notification message.

In practical applications, after the user determines the target notification message, the electronic device can include the target notification message in the message reading interface, and the user can operate the electronic device to display the message reading interface, and can read the target notification message through the message reading interface, which is convenient for the user to read the target notification message.

In some embodiments, the display unit 906 is further configured to display, at a first preset location on the application program icon, identification information corresponding to the target notification message.

In practical applications, when the user selects the target notification message in the notification bar, the electronic device displays corresponding identification information on the application program icon displayed on the display screen, which can remind the user that the application program includes the notification message that has been included, and avoid that the user forgets the target notification message.

It should be understood that, in this embodiment of this application, the input unit 904 may include a graphics processing unit (GPU) 9041 and a microphone 9042, and the graphics processing unit 9041 processes image data of a still picture or a video obtained by an image capture apparatus (such as a camera) in a video capture mode or an image capture mode. The display unit 906 may include the display panel 9061. The display panel 9061 may be configured in a form of a liquid crystal display, an organic light-emitting diode, or the like. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein. The memory 909 may be configured to store a software program and various data, including but not limited to an application program and an operating system. The processor 910 may be integrated with an application processor and a modem processor. The application processor mainly processes an operating system, a user interface, an application program, and the like. The modem processor mainly processes wireless communication. It can be understood that, the modem processor may not be integrated into the processor 910.

An embodiment of the present application further provides a readable storage medium. The readable storage medium stores a program or an instruction, and when the program or the instruction is executed by a processor, the various processes of the foregoing notification message display method embodiment is performed and the same technical effects can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, an optical disc, or the like.

An embodiment of the present application further provides a chip, the chip includes a processor and a communication interface, the communication interface is coupled to the processor, and the processor is configured to run programs or instructions to implement each process of the embodiment of the foregoing notification message display method and the same technical effects can be achieved. To avoid repetition, details are not described herein again.

It should be understood that the chip mentioned in this embodiment of this application may also be referred to as a system-level chip, a system chip, a system on chip, a system chip on chip, and the like.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, a network device, or the like) to perform the method described in the embodiments of this application.

It can be understood that the embodiments described in the present disclosure may be implemented by hardware, software, firmware, middleware, microcode, or a combination thereof. For hardware implementation, a module, a unit, a subunit, or the like may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions described in the present disclosure, or a combination thereof. For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method of notification message display, performed by an electronic device, comprising:

receiving a first input performed on an application program icon;

determining a target notification message from at least one notification message displayed in a notification bar, wherein the at least one notification message is received by an application program to which the application program icon belongs;

canceling the display of the target notification message in the notification bar;

displaying identification information at a preset position of the application program icon displayed in the notification bar after canceling the display of the target notification message in the notification bar; and displaying a message preview window, wherein the message preview window comprises a target content in the target notification message.

2. The method according to claim 1, after determining the target notification message, further comprising:

canceling displaying notification messages other than the target notification message in the notification bar.

3. The method according to claim 1, further comprising:

receiving a third input; and displaying a message reading interface in response to the third input, wherein the message reading interface comprises the target notification message.

4. The method according to claim 1, after determining the target notification message, further comprising:

displaying, at a first preset location on the application program icon, identification information corresponding to the target notification message.

5. An electronic device, comprising a processor, a memory, and a program or instruction stored on the memory and executable on the processor, wherein when the program or instruction is executed by the processor, cause the processor to perform operations comprising;

receiving a first input performed on an application program icon; and determining a target notification message from at least one notification message displayed in a notification bar, wherein the at least one notification message is received by an application program to which the application program icon belongs;

canceling the display of the target notification message in the notification bar;

displaying identification information at a preset position of the application program icon displayed in the notification bar after canceling the display of the target notification message in the notification bar; and displaying a message preview window, wherein the message preview window comprises a target content in the target notification message.

6. The electronic device according to claim 5, after determining the target notification message, the operations further comprise:

canceling displaying notification messages other than the target notification message in the notification bar.

7. The electronic device according to claim 5, the operations further comprise:

receiving a third input; and displaying a message reading interface in response to the third input, wherein the message reading interface comprises the target notification message.

8. The electronic device according to claim 5, after determining the target notification message, the operations further comprise:

displaying, at a first preset location on the application program icon, identification information corresponding to the target notification message.

9. A non-transitory computer-readable storage medium, storing a program or an instruction, wherein when the program or instruction is executed by a processor, cause the processor to perform operations comprising:

receiving a first input performed on an application program icon; and determining a target notification message from at least one notification message displayed in a notification bar, wherein the at least one notification message is received by an application program to which the application program icon belongs;

canceling the display of the target notification message in the notification bar;

displaying identification information at a preset position of the application program icon displayed in the notification bar after canceling the display of the target notification message in the notification bar; and displaying a message preview window, wherein the message preview window comprises a target content in the target notification message.

10. The electronic device according to claim 9 the operations further comprise:

canceling displaying notification messages other than the target notification message in the notification bar.

11. The electronic device according to claim 9, the operations further comprise:

receiving a third input; and displaying a message reading interface in response to the third input, wherein the message reading interface comprises the target notification message.

12. The electronic device according to claim 9, after determining the target notification message, the operations further comprise:

displaying, at a first preset location on the application program icon, identification information corresponding to the target notification message.

* * * * *